US007921289B2

(12) United States Patent
Teijido et al.

(10) Patent No.: US 7,921,289 B2
(45) Date of Patent: Apr. 5, 2011

(54) SECURE COMPARTMENTED MODE KNOWLEDGE MANAGEMENT PORTAL

(75) Inventors: Daniel Teijido, Safety Harbor, FL (US); Joseph M. Silcox, Clearwater, FL (US); Robert C. Moehl, Largo, FL (US); Craig H. Kobren, McKinney, TX (US)

(73) Assignee: Raytheon Company, Waltham, MA (US)

( * ) Notice: Subject to any disclaimer, the term of this patent is extended or adjusted under 35 U.S.C. 154(b) by 941 days.

(21) Appl. No.: 11/674,932

(22) Filed: Feb. 14, 2007

(65) Prior Publication Data

US 2007/0204336 A1 Aug. 30, 2007

Related U.S. Application Data

(62) Division of application No. 09/892,281, filed on Jun. 26, 2001, now abandoned.

(60) Provisional application No. 60/215,594, filed on Jun. 30, 2000.

(51) Int. Cl.
*H04L 29/06* (2006.01)

(52) U.S. Cl. ............ 713/166; 380/286; 726/11; 726/16; 726/27; 726/2; 713/167

(58) Field of Classification Search .......... 713/166–167; 726/2, 11–13, 16, 27; 380/286
See application file for complete search history.

(56) References Cited

U.S. PATENT DOCUMENTS

| 5,276,901 | A | | 1/1994 | Howell et al. ................. 707/9 |
| 5,315,657 | A | * | 5/1994 | Abadi et al. .................. 726/4 |
| 5,765,152 | A | | 6/1998 | Erickson ..................... 707/9 |
| 5,872,847 | A | * | 2/1999 | Boyle et al. ............... 713/151 |
| 5,940,591 | A | | 8/1999 | Boyle et al. ........... 395/187.01 |
| 5,996,077 | A | | 11/1999 | Williams .................. 713/201 |
| 6,408,336 | B1 | | 6/2002 | Schneider et al. .......... 709/229 |
| 6,549,626 | B1 | * | 4/2003 | Al-Salqan ................ 380/286 |
| 6,950,943 | B1 | | 9/2005 | Bacha et al. .............. 713/164 |

OTHER PUBLICATIONS

Freier et al., The SSL Protocol, Version 3.0, Nov. 18, 1996.
PCT Search Report for PCT/USO1/41213, 4 paages, Jun. 16, 2003.
International Search Report dated Jan. 9, 2002 for PCT/US01/41213, Jan. 9, 2002.

* cited by examiner

*Primary Examiner* — Minh Dinh
*Assistant Examiner* — Virginia Ho
(74) *Attorney, Agent, or Firm* — Baker Botts L.L.P.

(57) ABSTRACT

A layered defense-in-depth knowledge-based data management comprises a reception zone for authenticating a user for access to the system and an operations zone for adjudicating on a user level access to data objects stored in the system database. In addition, the data management comprises a security zone for issuing certificates of accessibility for defined users and a screening zone to interrogate data packets during processing thereof. The first line of defense is firewall protection and packet filtering preceding the reception zone.

18 Claims, 3 Drawing Sheets

SECURE COMPARTMENTED MODE KNOWLEDGE MANAGEMENT PORTAL

RELATED APPLICATION

This application is a divisional of application Ser. No. 09/892,281 filed Jun. 26, 2001, entitled Secure Compartmented Mode Knowledge Management Portal.

Application Ser. No. 09/892,281 claims the benefit of U.S. provisional application Ser. No. 60/215,594, filed Jun. 30, 2000, entitled Secure Compartmented Mode Knowledge Management Portal.

TECHNICAL FIELD OF THE INVENTION

This invention relates to a knowledge management security system for mitigation of security issues, and more particularly to a knowledge management portal utilizing a layered defense-in-depth strategy to achieve levels of protection traditionally only possible with products approved under DoD Orange Book Criteria for the B1 level of assurance.

BACKGROUND OF THE INVENTION

The military and commercial organizations have heretofore relied on stringent access control methods for insuring that sensitive data did not find its way to those that did not have a formal need-to-know. Traditionally, the military has relied on a brand of products that the National Security Agency has tested and placed on the Evaluated Products List. These products provide discretionary and mandatory access control (DAC/MAC) of all data objects through the use of sensitivity labels. While providing a high degree of protection against unauthorized disclosures, these products severely restrict the number and type of applications that can be hosted. Additionally, these products are difficult to configure, manage and are more costly than standard commercial off the shelf (COTS) hardware and software components. As the military follows industry trends towards a web-centric based information environment; the ability of products from the evaluated products list to support the latest authoring technologies will be limited at best. Extensive development by software engineers specially trained in the trusted code generation and testing would be required to move toward a web-centric environment.

Most attempts at providing compartmentalized web-centric based information technology services has revolved around the use of trusted database management systems (DBMS), evaluated by the National Security Agency to provide compartmentalized or need-to-know security services. These DBMSs serve the repository for web-content. Customized middle-ware applications are used to query the DBMS and retrieve the appropriate material. This methodology strictly limits individuals to only that content for which they have a valid need-to-know. However, development and maintenance cost to generate the required middle-ware applications is high. Additionally, without exhaustive testing of this developed software, the high degree of security derived from using trusted products is impacted and results in a possibly significant increase in residual risk.

SUMMARY OF THE INVENTION

The present invention is an information service used to provide electronic access to and delivery of stored documentation, data, and information via the wide area network (WAN). It provides an archival capability that is made available to users on an on-line, real-time basis through electronic communications. The invention is a web-based service that provides the capability to control, store, sort, locate, and retrieve maintained information/documentation.

The implementation of a preferred embodiment contains two major suites of products; one to provide the underlying document manipulation architecture and the other to provide the security for the transactions undertaken while using the library. A document management system (DMS) is used to define the structure and the characteristics of the library and the documents stored and protected. Public Key Infracture/PKI is used to provide secure electronic access to the system from the users' desktop to the library.

Administrators of the system are considered local users and will access the system through either the DMS server and PC, or PKI administration workstations. The DMS server will be logged onto directly by the administrator and authenticated through the DMS application only. These servers/workstations are physically secured in the system area with locks and alarms/sensors.

The present invention utilizes standard COTS components used in conjunction with a layered defense-in-depth strategy to achieve the same levels of protection that traditionally have only been possible with trusted products. Safeguards are identified based not on a specified requirement or directive, but rather on the threat, vulnerability, and exposure that the system must be protected from. Each safeguard is evaluated based on a proven risk management process that determines both the intrinsic value and the resulting residual value when it is combined with other system protection mechanisms. The present invention comprises PKI, DMS, and DBMS. PKI provides authentication services for each user based on their assigned need-to-know, but it also is used by all components for authentication, encryption digital signatures, and key management. These features are based on sensitivity of the data as well as the need-to-know access granted to an Individual, a process, or a component. DMS captures, configures, and manages business knowledge—the understanding of the relationships between people, information, and processes that interact with each other to accomplish a business objective. DMS combines inherent access control features with PKI user authentication, data encryption and digital signatures to provide both DAC and MAC for all actions under control.

By using only standard COTS components, the present invention is not hosted on a trusted platform, thereby resulting in a significant decrease in administrative costs associated with interfacing, maintaining, and managing trusted interfaces. The system of the present invention is more readily able to integrate new applications without encountering the difficulties normally present when accessing trusted platform input/output drivers.

By reliance on PKI, the system establishes a strong security posture. This posture remains unaffected by custom developments, since the security module that is used is for authentication, encryption, digital signatures, etc. is also COTS and evaluated to the same level of compliance as the core PKI system itself.

A defense-in-depth strategy is applied that incorporates security risk management versus security risk avoidance. This reduces costs and simplifies management. A managed PKI is used that delivers, manages, and maintains the security posture of the system end-to-end in a transparent and automated manner. The PKI establishes and adjudicates the relationship between Individuals, processes, and data based on the need-to-know accesses of the individuals and processes as compared to the sensitivity of the data. The mandatory access control (MAC) security functions are transferred from the client application to the server and consequently, provide stronger protection by improving the ability of the system to protect against inadvertent disclosures. The need to develop custom applications for linking the DBMS repositories to web-centric user services is minimized.

A feature of the invention provides a content management engine for enterprise portals that dynamically aggregates business knowledge, processes, and content within and between organizations while preserving need-to-know policies.

Further, in accordance with the invention there is provided the ability to capture, configure, and manage business knowledge—the understanding of the relationships between people, information, and processes that interact with each other to accomplish a business objective. The process of the invention achieves this while adhering to the stated security policy and the need to maintain strict separation of data both during storage and transference based on the sensitivity of the data and an individual's or process's formally authorized need-to-know state.

In accordance with the invention, there is provided the ability to host and disseminate raw and aggregated data through robust web-enabled applications that scale to the demands of a dynamically growing internet.

In addition, the invention provides the ability to automate the correlation between business processes and the associated content in a dynamic manner. Specifically, tools are required which make it possible to configure business knowledge to correspond to dynamically changing mission requirements.

Also, the system of the invention provides an architecture capable of supporting Web enabled knowledge management that functions in both centralized and distributed environments, is interoperable with legacy LAN environments and WAN, and enables global transparent access to knowledge via corporate portals.

The invention provides the ability to aggregate relevant content with the appropriate business functions to create personalized views that improve productivity by keeping knowledge workers in sync with changing content and processes.

An embodiment of the invention provides Web style content management services that manage content storage, versioning, publishing, security, tracking, and archiving. By automating Web content management, it is possible to ensure content integrity by eliminating the errors associated with manual; content management tasks.

The present invention operates over WAN and inter-operates with standards based commercially available LAN configurations. Users of the system and information processed by the system are equivalent to those found on WAN and the networks attached to it.

A layered defense-in-depth knowledge-based data management comprises a reception zone for authenticating a user for access to the system and an operations zone for adjudicating on a user level access to data objects stored in the system database. In addition, the data management comprises a security zone for issuing certificates of accessibility for defined users and a screening zone to interrogate data packets during processing thereof. The first line of defense is firewall protection and packet filtering preceding the reception zone.

BRIEF DESCRIPTION OF THE DRAWINGS

A more complete understanding of the present invention may be had by reference to the following detailed description when taken in conjunction with the accompanying drawings within.

DETAILED DESCRIPTION OF THE INVENTION

Figure 1:
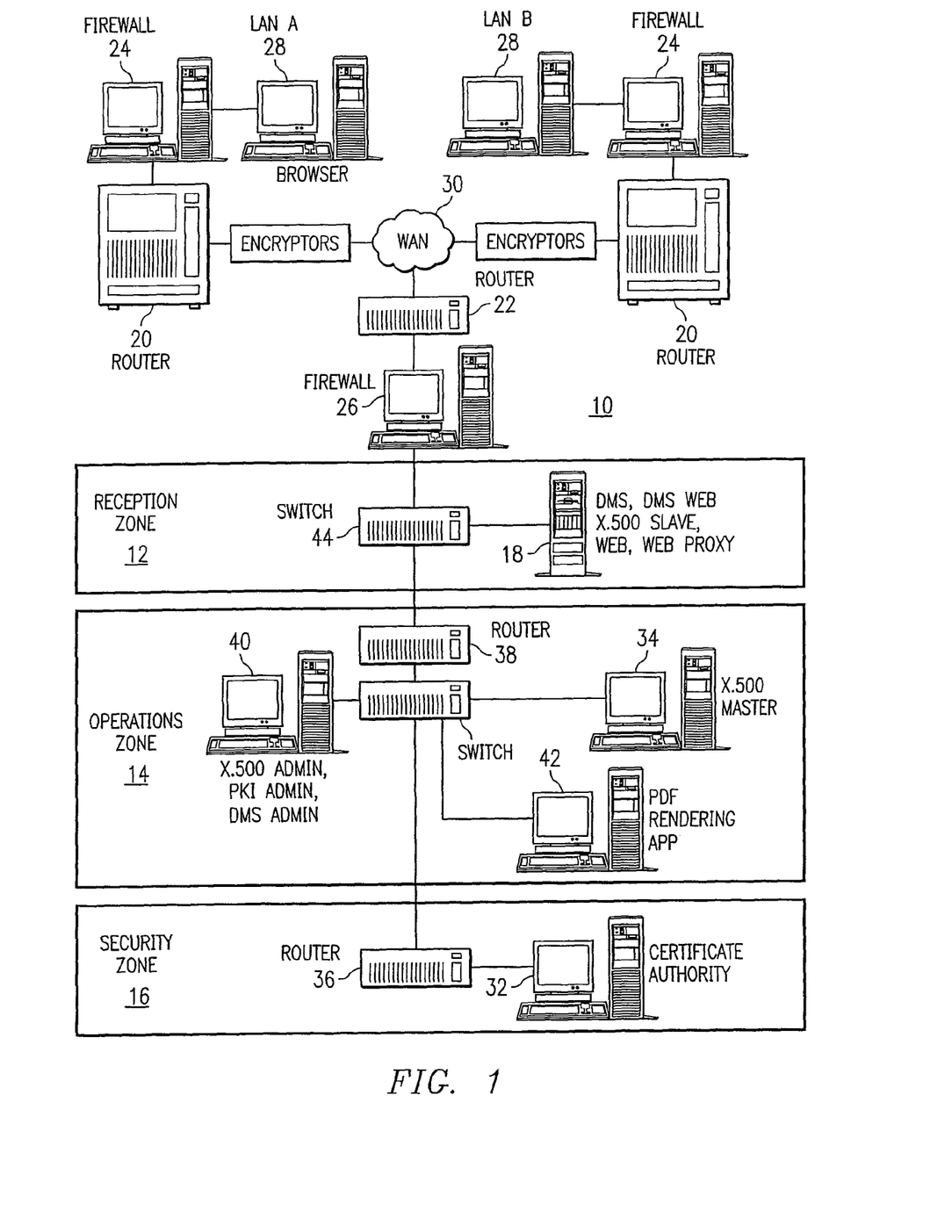
FIG. 1 is a block diagram of a knowledge management system in accordance with the present invention, comprising a document management component, a web service component, and a public key infrastructure (PKI) component. In addition, each subsequent zone restricts access to components and processes operated therein.
Figure 2:
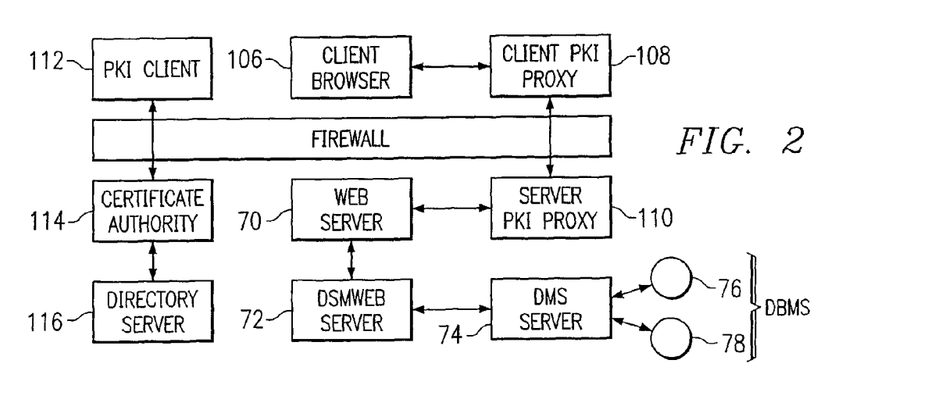
FIG. 2 is a block diagram illustrating the interface between the three zones as illustrated in FIG. 1 and user LANs through web browsers and the data flow associated therewith.
Figure 3:
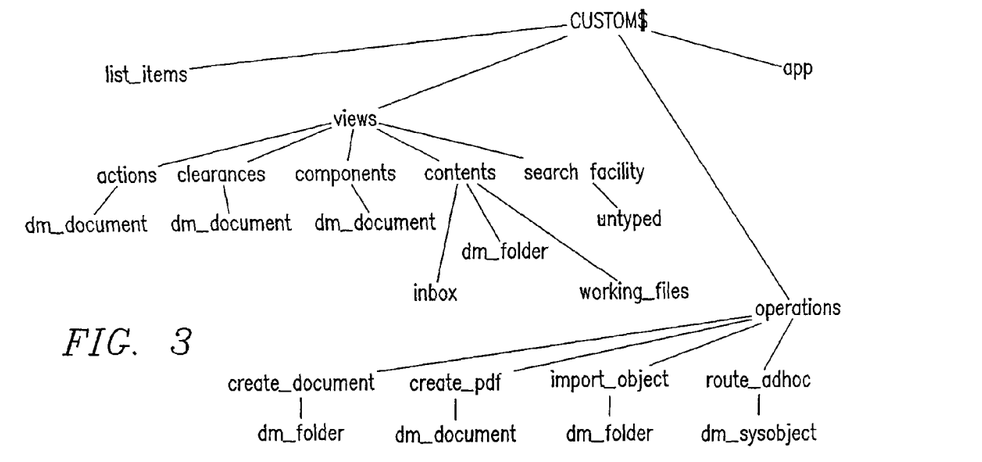
FIG. 3 is an illustration of a Secure Compartmented Mode Knowledge Management Portal (SCMKMP) web customization for the knowledge management system of FIG. 1.

Referring to FIGS. 1-3, a layered defense-in-depth strategy achieves the same levels of protection using standard COTS components that traditionally have only been possible with trusted products. Safeguards are identified based not on a specified requirement or directive, but rather on the threat, vulnerability, and exposure that the system must be protected from. Each safeguard is evaluated based on a proven risk management process that determines both the intrinsic value and the resulting residual value when combined with other system protection mechanisms.

Information assurance architecture utilized by the system provides currently available protection technology in a layered system of defenses. As shown in FIG. 1, there are four zones of defense providing three layers of protection: a screening zone 10, reception zone 12, operations zone 14, and security zone 16. Within each of these zones, various techniques are utilized to protect the zone and to authenticate those transactions that must traverse onto the next lower zone.

The first line of defense is the ability to tightly control the level of access and the electronic processes relied upon in the major elements of the system and to the information stored within the system. This authentication process is carried out from a client workstation to the reception zone 12. Through a public key infrastructure (PKI), users and the processes relied upon (i.e., client to server, etc) mutually authenticate one another. The resulting session is encrypted and all transactions signed. Access to the PKI certificates is further controlled by the access control list of the X.500 directory resident in a server 18 of the reception zone 12. By restricting access to the X.500 entries, a more granular need-to-know policy is enforced.

In the present embodiment, multiple authentications are required to gain access to the various applications or for self identifying to the various security systems. While it is possible to modify these applications to support, a single sign-on based on the PKI certificate of a user, that capability may be made available as a standard feature.

Using a PKI for authentication, encryption, and non-repudiation, the present invention far exceeds the ability of most trusted systems. Most compartmented mode workstations (CMW) platforms are not able to support PKI because of their custom operating system. In fact, there are only a few CMW products on the market today that can support PKI. One such product is from Trusted Computer Solutions (TCS). It however only uses the PKI for Web based access.

While MAC labels do provide the means to reliably enforce data separation and access controls, with the exception of the TCS product, all transactions are actually performed in the clear. It is possible for an inside threat to actually snoop the packets and gain access to identification, passwords and actual data. In addition, user access is controlled solely through an identification and password. With a PKI based system, two-factor authentication is inherent.

The second line of defense is based on the ability of screening routers 20, 22 and application proxy firewalls 24, 26 to interrogate each packet as it is processed. This is performed in the screening zone 10. All transactions initiated by a user at a workstation 28 or by a hardware or software component are adjudicated through a combination of packet level filtering and application level proxies. Using screening routers 20, 22 and application proxy firewalls 24, 26, all information packets and protocols are adjudicated to ensure that only permitted services are being provided to authorized users. Users are further scrutinized by the firewalls 24, 26 by requiring authentication before the user is granted access to network services.

A Compartmented Mode Workstation (CMW) based system uses a combination of a trusted host table and label checking for establishing that a session or a transaction request should be accepted. While this is adequate and synonymous with the present invention, the danger is that the system that is responsible for adjudicating the request is also the same system that is processing and acting on the request. Without a layered defense, the risk associated with a single failure is greater.

The third level of defense is access control. Specifically, is the ability of the Document Management System (DMS) and the Database Management System (DBMS) to use an access control list for adjudicating on a user level who has access to the data objects stored within the database. This is coupled with a strong administration policy in which the owner of the data is not able to modify the access rights of the data. The access rights originally associated with the data object remain with the data object. In this way, MAC "type" controls are employed to provide the same level of protection that is normally provided through a trusted system such as a CMW and a trusted database.

The access control applied to each data object is also used by the web publishing feature of the DMS to dynamically assemble and deliver different content to different users according to the access rules defined in the DBMS. The dynamically generated content is then further interrogated to determine if the resulting presentation is more sensitive than the individual elements. It is then possible to determine what content is appropriate for what user.

By distributing the security functions across multiple zones 10, 12, 14 and 16 and then establishing strict two-people rules for performing configuration changes, the present invention provides the same or stronger security than trusted systems.

DMS dynamically aggregates business knowledge, processes, and content within and between organizations. It also delivers capabilities for building, deploying, and administering e-business solutions. DMS captures, configures, and manages business knowledge—the understanding of the relationships between people, information, and processes that interact with each other to accomplish a business objective. DMS combines inherent access control features with PKI user authentication, data encryption, and digital signatures to provide both DAC and MAC for all controlled actions.

The final element of the security software is the DBMS. This component like those previously discussed is tightly integrated with PKI. Access to the database is controlled through strong authentication. Elements within the database itself are digital signed to ensure that integrity is unaffected.

These three components as stated above are standard COTS products. This alone enhances flexibility and scalability to a level that surpasses all previous attempts to provide web-centric services to an operating environment. By using only standard COTS components, the present invention is not required to be hosted on trusted platforms such as CMWs. This results in a significant decrease in administrative costs associated with interfacing, maintaining, and managing trusted interfaces. In addition, as new functions are required, the system of FIGS. 1 and 2 is more readily able to integrate new applications without encountering the difficulties normally present when accessing trusted platform input/output drivers.

The reliance on PKI for all key elements of the security architecture establishes a strong security posture among the various components and applications. More importantly this posture remains unaffected by custom developments, since the security module used is for authentication, encryption, digital signatures, etc. and is also a COTS component and evaluated to the same level of compliance as the core PKI system itself.

The present invention is a knowledge management system configured in accordance with a defense in depth strategy. It is composed of three key architectural elements: a document management component, a web service component, and a public key infrastructure (PKI) component. As illustrated in FIG. 1 these three components are positioned behind a firewall 24, 26 controlled and managed as part of WAN 30. The firewall 24 provides the first level of defense against unauthorized users. The firewall is configured to provide proxy services in response to requests by users or system components resident on the user desktop. All interactions must be adjudicated through the firewall 24. All unauthorized attempts to connect with the system are audited by the firewall 24.

Users access the stored content by first authenticating themselves to the public key infrastructure component. Authentication is handled by a PKI Proxy 108 (see FIG. 2). The PKI Proxy 108 is a client/server application resident on the workstation 106. The PKI Proxy client 108 resides on the workstation 106 and establishes a mutually authenticated session between the browser of the user and the web server. The PKI Proxy client application acts as a proxy, intercepting all http requests and then encrypting and signing them. Responses from the Web server are also encrypted and signed. All transactions are validated by verifying the signatures.

Once the PKI session is established, the web browser utilized by the user establishes a connection with the web server. Users are authenticated individually to the document management server. All transactions with the server that fall within a specific profile are logged and audited. Access to data stored within the library and controlled by the document management server is determined based on the authentication credentials of the user. All data is stored within the file system and relative references are stored within the RDBMS. Access rights to the data via the RDBMS is controlled by system administrators.

The public key infrastructure (PKI) is controlled and managed by a certificate authority (CA) 104 resident in server 32. The CA 104 is responsible for all aspects of certificate management. This is coordinated and supported through the PKI Proxy server 110 and PKI client residing on the desktop of the user. These client side applications coordinate all PKI related management tasks with the CA 104. These transactions are encrypted and signed to ensure confidentiality and integrity. Information on the certificates themselves are stored within an X.500 directory resident in a server 34. This directory is accessed by PKI enabled components such as the PKI Proxy client 108 to obtain the encryption and signature keys of the peer server component. Access to the directory server is performed through authentication.

All subsequent transactions are performed in the same manner as described above.

A functional description of the system and the purpose or mission for the system use will now be provided. This description includes functional diagrams of the system and describes functions performed jointly with other systems.

The system functionality is resident in the three zones 12, 14 and 16 of processing, that separate and restrict access by the operations that an individual accessing the library needs to perform. For example, the average users request for data is handled in one zone, while the document manipulations performed by a document administrator are handled in a second zone not accessible by the average user. Likewise, certificates that are issued to users that allow access to the library are managed in a third zone not accessible by the average user or the document administrators. This is further described in the following paragraphs.

The security zone 16 of the system hosts the certificate authority (CA), 104 residing on a server 32. The CA 104 issues certificates for defined users; revokes certificates for users no longer allowed access and performs key recovery operations. Access to the security zone 16 is tightly controlled and restricted to only authorized local users. Access to the zone itself is protected with a router 36 performing packet filtering on incoming and outgoing traffic. Filters within the router 36 are used to tightly control and limit access to only a predefined specific set of client machines. In addition, all hardware within the security zone 16 is protected with unique passwords.

All actions and activities on the CA 104 are recorded and logged. Any generation, revocation, or recovery activities associated with the certificates are protected by a two-man rule. These activities require individuals to log in and authenticate themselves in order to enact any changes.

Documentation administration is an operation in the operation zone 14 and hosts the administrative functions of the system. All access to this zone is controlled in two different ways. First (in the same fashion as the security zone 16), a router 38 performs packet filtering on incoming and outgoing traffic. Secondly, all hardware within this zone is protected with unique passwords. All activity on the system is logged and monitored.

The two main components resident in this area are a workstation 40 and the server 34. The workstation 40 is used to execute PKI, DMS, and X.500 Administration. These products provide administrators with the tools necessary for configuring and maintaining the system. Access and use of these products can be performed locally or remotely.

The server 34 hosts the primary X.500 directory. The directory contains a master set of X.509 certificates for all valid system users. Automated synchronization software ensures that the X.500 directory 102 located in the reception zone 12 on the server 18 is always current with the master in the operations zone 14.

The primary area of activity in the system occurs in the area labeled as the reception zone 12. This area contains the system server and dissemination software hosted on the server 18.

Software resident on the server includes the X.500 Directory Server, web server 70, DMS web server 72, DMS server, DBMS server and OS. These products work in tandem to provide access to all users. The X.500 software manages controls, disseminates, and protects X.509 compliant PKI certificates. The server 18 located in this zone shadows a similar server 34 located in the operations zone 14 and is duplicated for security purposes. By using two X.500 directory servers 18 and 34, the X.509 certificate is afforded an additional layer of protection. There is also a PC 42 in the operations zone 14 that provides portable document format (PDF) of the documents requested by a user.

Each user having authorized access to the system is assigned an X.509 certificate. Use of the certificate is protected by a unique password that only the user knows. The certificate is stored on the workstation of the user and used by the associated browser. Since each certificate is unique, assigned to an individual user, and protected by a password, a single workstation and browser can be used to support multiple users.

Referring to FIG. 2, the browser and associated plug-ins incorporate the X.509 certificate when performing any transaction. When a browser initiates a transaction, the transaction is received and processed by a web server 70. The server queries the X.500 Directory server 116 to validate the certificate presented by the browser. If a match occurs, the transaction is secured with 128-bit encryption. Additionally, any documents or data objects that are digitally signed are also validated against the certificate stored in the X.500 server 116.

Once the request for service is validated and the session secured, the web server 70 launches a request to the DMS web server 72. The DMS web server processes special Web query language (QL) tags that reside in HTML files. The tags provide a macro like capability that allows dynamic HTML page creation based on the users permission.

The DMS server 74 manages and controls all data objects, regardless of format, that are located in the rough metadata that is stored in a DBMS 76, 78. When the DMS server 74 receives the query a search is begun of the database for the information desired. As the server finds a data object that meets the criteria, an assessment is made whether the requestor has access to that information. If the requestor does not have a need to know, the data is never delivered to the DMS web server 72. Once all applicable data has been retrieved, the DMS web server 72 assembles the data dynamically into an HTML page. When the DMS web server 72 has dynamically assembled the HTML page, the page is passed back to the web Server 70 as standard HTML. This feature makes it possible to present individual views of the same data without having to manually create that view. The DMS web server 72 takes care of ensuring that the right content is delivered to the correct user. It should be noted that the user has ultimate responsibility for ensuring that the access level associated with a content of a document falls within the range of the documents assigned Accredited Security Parameter (ASP).

The system insures that data stored within the library is disseminated only to authorized individuals. The system maintains sensitivity labels, as well as access control list for each object to determine if the data may be obtained by a specific user or process. It is this mechanism that ensures that document content remains undisclosed to individuals without a need to know.

Integrity of data objects is preserved through the use by the Document Management Server of an object's manipulation properties. Access control lists ensure that only authorized individuals can make changes to a baselined object. The modification itself is versioned and recorded. Transactions between the library and the browsers of various users are encrypted and signed to insure that the data is not modified during the transmission.

The system operates in conjunction with an overlay on the WAN 30. The WAN 30 supplements the system by monitoring and managing network connectivity and system security. The WAN 30 also ensures that sufficient bandwidth is available for user sessions. All transactions are adjudicated through the firewalls 24 and 26. Monitoring for unauthorized activities is performed by the network operations center on a continuous basis to ensure that systems are protected by insider threats.

Library users are divided into three groups: consumers, contributors, and administrators. Consumers are users that access the library through Web based applications to view and possible annotate PDF renditions of documents. Consumers are not allowed to submit new content or modify content to the library.

Contributors also use Web based applications to access the library. These users are allowed to contribute and modify objects stored in the library. Contributors are also allowed to define and activate business processes such as a document review.

Administrators are subdivided into three sub-groups: security administrators, system administrators, and library administrators. The security administrators are responsible for the configuration and management of the PKI. Any actions affecting the state of a certificate for an individual requires two person positive control to enact the change.

System administrators are responsible for the configuration and management of the library hardware. Where possible, such as with a Unix based system, privileges are controlled through the use of account resource management agents. Access to root accounts require two party authorization. The system administrators are also responsible for the management of the X.500 directory service.

Library administrators are responsible for the configuration and management of the document manager server component. Roles and responsibilities for this task are shared among multiple individuals.

Referring to FIG. 1, external electronic threats to the network are minimized by the use of encryptors 80, 82. These devices secure all media used to establish the communication circuits between the various organizations relying on WAN 30 for connectivity.

Each site employs a screened host firewall system 24. A packet-filtering router 20 and an application-level proxy firewall 24 protect against attacks. This provides a high level of security through use of both network-layer (packet filtering) and application-layer (proxy services) safeguards. As shown in the FIG. 1, an insider threat resident of a LAN user would have to penetrate four separate systems (two firewalls 24, 26 and two screening routers 22, 44) before the system is even reached.

Each of the screening routers 22, 44 invokes a sophisticated filtering software module. The module invokes filters to enforce the WAN 30 security policy by permitting or denying connections based on protocol, services/application, and internet protocol address. In addition, the filters ensure that outside users and the systems are resident on can access only the firewall 26 that protects the system. The only exception to this is an encrypted session that is required by the PKI components for key updates. Receipt of a packet that is identified as unauthorized, results in activation of a reporting and protection mechanism. The packet and all associated information such as the connection, the session, the host id, etc. are logged and reported. The session is then terminated, preventing further access attempts.

The application level proxy firewall 24 acts as a transparent intermediary between client and information servers that provide information requested by the client. When a connection request occurs, the TCP/IP connection is broken at the server to reduce the potential for network intrusions. The firewall 24 executes a number of proxies, which are application specific. In the case of the system, the firewall 24 invokes the HTTP proxy for Web services. It is also provides a generic proxy for use by the PKI and server components for key management services. The firewall, like the screening routers 22, 44, also logs and defends itself against attack. The firewall 24 will record all unauthorized attempts to bypass the proxies and then stop the connection upon which it was received.

The WAN 30 security provides a strong system of defense against outside attack of the system. The system however, also contains a number of defenses against attack by those users that exist within either the system itself, or those that are authorized access to the library and public key server. As shown in the FIG. 1, the system is subdivided into three zones: reception zone 12, operations zone 14, and the security zone 16. Beginning at the reception zone 12, each subsequent zone further restricts access to the components and processes that operate within each zone.

The reception zone 12 as the name implies is where user requests for data is received and handled. The processing for a request for information from the system begins at the screened host firewall. Based on established filtering and proxy rules an authorized request is allowed through.

All Web transactions, one of the means for extraction of data from the system, are protected through a pair of proxies that provide secure communication between the web browser and the secure web server. By using a strong, mutual certificate based authentication, the system provides fine grained access control to the web server and other applications. The proxies do not use any of the security features of the web browser or the web server. Instead of the user-centric trust model followed by existing web browsers, the dual proxy feature used by the system subscribes an administration-oriented trust mode. The administrator defines the users to trust and the secure web sites that users should trust, instead of letting users decide which web sites to trust.

The two proxies use mutual authentication using digital signatures. End users credentials are accessed from a computer available to a user using a password known only to the user. The client software retrieves the end encryption certificate of the user from the directory, it validates the certificates of the end user and retrieves and checks certificate revocation lists to ensure the certificate of the end user has not been revoked.

When the client proxy calls a URL protected by the proxy protected Web server, the server proxy responds with a special "authenticate yourself" http header. Then the client proxy receives the special header and initiates authentication with the server proxy. Once the security context has been established, either end can send protected messages to each other. All "gets" are tagged with a Message Authentication Certificate (MAC), and http "posts" are signed (for integrity).

The establishment of the secure session and the session itself insures that proper user authentication has occurred and that the confidentiality of the data remains intact.

There is no further access below the reception zone 12 other than the secure session that is established by the client side PKI application and the certificate authority (CA).

Access to the reception zone 12 from the operations zone 14 or the security zone 16 is protected in two ways. First, a security router 36 or 38 that exists in these zones is configured to provide packet filtering. The filters scrutinize every packet to ensure that the packet origin and intended destination are correct, that the protocol being used is authorized, and that the service ports that are being used are in accordance with the Automated Information Security Plan (AISSP).

Secondly, the server-to-server and server-to-client paths are controlled through the creation of virtual LANs (VLAN). A VLAN is a logical grouping of network components regardless of a physical connection. The creation and administration of the VLAN is done through the security routers 20, 22 and the Ethernet switches located in each of the zones. The VLANs strictly controls access to system processing components by establishing specific relationships between the server and client platforms that make up the system.

The operations zone 14 and security zone 16 are protected in the same way as the reception zone 12, through filtering and VLANs. Logs of all security relevant events are maintained by all network components. These are audited on a regular basis.

The router 36 or 38 is used to provide security filtering of packets as the packets traverse the operations zone 14 and security zone 16 boundaries by checking the internet protocol address and the protocol of the request. Specifically, "Uniform Traffic Filters" can be applied on inbound and outbound protocol traffic to ensure only allowed traffic is passed. These filters can be configured to accept or drop packets at any of the interfaces to a router, as well as log matches between a packet and a filter, thereby providing an audit trail of specified network activity. This router supports a variety of LAN and WAN interfaces, and has expansion modules available.

The switch 22 is used to provide Ethernet connectivity for the system components both to the WAN firewall and within the system zones. The switch 22 is stackable; allowing for planned system growth and most importantly automatically detects and supports the speed of a connected device. As system performance requirements increase, any equipment upgrades to Fast Ethernet (10 to 100 Mbps) are automatically supported with no intervention.

The servers 18 and 34 host the primary X.500 directory in the operations zone 14 and the public directory in the reception zone 16. Each contains the master set of X.509 certificates. Automated synchronization software ensures that the X.500 directory located in the reception zone 12 is always current with the X.500 primary directory.

The server 18 platform will host the system applications in the reception zone 12, which include the system DBMS 76, 78 (see FIG. 3), DMS web server 72, DMS server 74, web server 70 and the X.500 Directory (Public copy).

A PC 40 in the operations zone 14 is used to host the PKI/Admin, DMS Admin and X.500 Directory Administration applications.

A PC 42 (see FIG. 1) hosts the PDF rendering application for creating the PDF formats of the documents requested by the user.

A Laserjet printer (not shown) is used to print any hardcopy reports required for maintenance of the system, as well as printing the outputs from the risk analysis tool.

The PDF rendering application is hosted on a dedicated PC 42 in the operations zone 14. When a request is made by a user for a particular document, PDF rendering receives the request and generates the PDF rendition (copy) that is associated with the native document.

DMS server 18 provides for accessing, storing and managing documents in the system and the applicable rules that apply. In this manner, documents are captured, stored, indexed and managed along with their attributes, version, relationships, workflows with status dates (routing for use/review, etc.), annotations and rules as defined by the document coordinator in a document repository. DMS server 18 can also dynamically assemble multiple individual documents to form virtual documents, on demand. Access control lists can be defined for each document to define within seven levels, document access ranging from "none" to "delete".

In addition, the DMS server 18 also provides a query language (DQL) for all documents in the system. Note that as each of the features of the DMS server are invoked, all security and other rules that are defined for the documents stored in the system are enforced, thereby ensuring only those users with clearance or need to know can access the data.

Specifically, the access control supplied by the DMS system can be applied at multiple levels; the document repository itself, defined cabinets, folders within the cabinets and data objects within the folders. Users are defined to have specific accesses, and users with like accesses are grouped together and may be specified in an Access Control List (ACL). Users can be defined to be members of different groups. These groups may then be granted varying permissions through ACLs.

Web browsers allows users (Consumers) to view and annotate documents in PDF format that are stored in the system using a PDF rendering tool. These annotations are then stored in the system with the original documents.

DMS server 18 integrates the capabilities of the DMS server 18 with the Web for accessing the system. Instead of publishing static Web pages for documents, this application dynamically assembles and delivers different content to different users according to predefined access rules. It also automates the process of delivering up to the minute content over the Web, eliminating manual update of the pages. This server includes contributor and consumer interfaces for users.

Document repository enables users to control and manage documents in the document repository by assigning workflows to each document and tracking the documents through the comment/review cycle.

The consumer interface works with DMS server 18 to define the policies and rules for creating and using documents, and the management of those documents in the system. The work flow to be defined and assigned to each document are defined at this level, and use office E-mail to notify users that there is a document for them to review.

PKI/Admin is the main administrative interface to the PKI, used by the system security officers, administrators and directory administrators. It is used to add and/or delete users, revoke certificates, change certification and key lifetimes, review security audit events and perform key recovery operations for the system network. Each session that is conducted between Administrator and CA is encrypted.

The Certification Authority (CA) issues all X.509 public-key certificates and performs key and certificate management functions for the system. These include creating certificates for all public keys, creating and backing up encryption key pairs for users, creating and updating the Certification Revocation List (CRL) and enforcing the system security policies for all defined users of the system. Several types of users are defined at this level: master users, security officers, entrust administrators and the directory administrator. Each of these users has specifically defined tasks for the maintenance of the Certificate Authority, and "rules" can be applied defining how many personnel are required to perform a specific action.

The PKI proxy provides secure sessions for web transactions with web browsers. Specifically, this software provides mutual authentication (only authorized individuals can access and submit information to a protected web site). Confidentiality and single logins to multiple web servers. Certificates are automatically checked for both the user and the server to ensure they are still trustworthy, and certificate updates happen automatically, so there is no disruption of service.

The web server 18 provides the basic web access to the user to access the system documents. It is a high performance server and is easily scalable to meet the needs of the system as it evolves. In addition, it has a high server availability/reliability to the user by automatically restarting failed server processes without administrator intervention. Finally, and perhaps most importantly, it integrates well with the Lightweight Directory Access Protocol (LDAP)-based directory server chosen for the system.

DBMS 7 is used to provide the underlying data base structure for the system. All document attributes are stored as objects for accessing using the query language in the DBMS database, while the documents themselves are stored in the file system.

The Directory is the repository for the public keys and the CRL used in the PKI for the system. It employs Light-weight Directory Access Protocol (LDAP) and X.500 directory structure for access to the public keys, and provides a single point for administration of each server (primary located in the operations zone 14 and the public in the reception zone 12). The directory can be replicated to ensure master entries are protected and not accessed by users during authentication. In addition, entry and attribute modification by the users of the directory is prohibited.

The system has one system interface. This interface exists at the WAN router 22. The WAN router 22 establishes the point of presence for system accessibility to WAN users. All transactions through this interface are adjudicated and are encrypted. No access to the data flowing through this interface is usually possible.

The system interfaces with user LANs 28 through Web browsers. This interface is handled through multiple proxies and is adjudicated by the WAN firewall 26 and authenticated through PKI components of the system.

Referring to FIG. 1, the system security mechanisms provide protection in three areas: confidentiality, integrity, and availability. The requirements that these mechanisms satisfy are based on the assigned Levels-Of-Concern and Protection Levels for each of these areas. The assigned value may be BASIC, MEDIUM, or HIGH. The value for each of the areas is totally independent. The values are determined by following the guidance found in the appropriate Security Classification Guides (SCG) for each Accredited Security Parameter (ASP) authorized to be on the system and the information characteristics of the system.

The Level-Of-Concern rating for confidentiality, integrity, and availability is determined by the Information System Security Officer (ISSO) and validated by the Designated Approving Authority (DAA) and the DAA REP. The criteria used to determine a value for each area and the value itself are detailed below:

a. Confidentiality. The confidentiality Level-Of-Concern rating is based on the sensitivity of the information that the system maintains, processes, and transmits. The more sensitive the information, the higher the Level-Of-Concern. Systems that process intelligence information require a HIGH Level-Of-Concern rating. Since all systems accredited under the authority of the Director of Central Intelligence Directive (DCID) 6/3 by definition process intelligence information, all systems accredited under DCID 6/3 are assigned a HIGH Confidentiality Level-Of-Concern.

b. Integrity. The integrity Level-Of-Concern rating is based on the degree of resistance to unauthorized modification of the information maintained, processed, and transmitted by the system that is necessary for accomplishing the mission of a user. The greater the needed degree of resistance to unauthorized modification, the higher the Level-Of-Concern. For the system, Integrity is designated a rating of HIGH. It therefore must provide a high degree of resistance against unauthorized modification, or the loss of integrity will have an effect on organizational-level interests.

c. Availability. The availability Level-Of-Concern rating is based on the degree of ready availability required for the information maintained, processed, and transmitted by the system in order to accomplish the mission of a user. The greater the need for rapid information availability the higher the availability Level-Of-Concern. For the system, availability is designated a rating of BASIC. As a result, the system must provide information with a flexible tolerance for delay, or loss of availability will have an adverse effect. Routine system outages must not endanger mission accomplishment; however, extended system outages (days to weeks) may endanger the mission.

The system of the present invention employs a number of security measures to ensure confidentiality, integrity, and availability of the system and the processed information. The selection of the safeguards for the system is based on the results of a security risk assessment. The risk assessment is used to identify specific areas that require safeguards against deliberate or inadvertent unauthorized disclosure, modification, or destruction of information; denial of service, and unauthorized use of the system. Countermeasures are applied in those areas to eliminate or adequately reduce the identified risk. That process is known as Security Risk Management. Input to the process comes from the—counterintelligence (CI) component, the—mission requirements, the classification and sensitivity of the information, and a balance, cost effective application of security disciplines and technologies. By taking into account the cost of protecting the system relative to the risk in not providing a specific safeguard, the system is able to provide an optimum security architecture.

The primary means of controlling access to the objects stored in the library is through the DAC mechanism inherent in the DMS. DMS includes the administrative features necessary to establish access control rights on every object that is created and placed into the library 100. It allows objects to be shared among various authorized users and/or groups. By default the DAC mechanism establishes the access rights that are allowed on an object as it is created based on the ASP of the user creating the object. The ASP of a user is based to the specific LAN on which the user is operating. Modification of access rights to an object or the granting or removing of rights to/from an individual or group is limited strictly to the system security staff.

The system as illustrated in FIG. 2 provides internal mechanisms that validates a request by one user to distribute data to another user within the bounds of the formal access approvals of both users and the object that is to be distributed. This mechanism relies upon the DAC features of DMS. In addition, DAC mechanisms within the X.500 Directory 102 interfacing with the certificate authority 104 provide the means for a user to verify what accesses another user may have in common. The database of access rights are maintained by the system administrative staff which serves as a trusted third party.

The system of FIG. 2 also provides the features necessary to allow users and internal processes to determine the sensitivity level of data stored in the library. These features are based on the structure of the library 100 and the access control mechanisms inherent in the system. Nested at the lowest level of each group or topic folder is an additional layer of folders corresponding to the sensitivity levels of the objects that fall under the upper level category. The system uses access control mechanisms to designate what specific individuals or groups may access a folder. This capability is also used by internal processes during activities such as: searches, directory browsing, workflow routing.

Referring to FIG. 3, there is illustrated a flow chart of the SCMKMP of the present invention.

To show contents of a folder, display clearance level & contents for each item.
Flow Path: CUSTOM$/views/contents/dm_folder
Files: 1) start.htm—added code to get user ID and pass the ID to Display Contents subroutine.
  2) dm_folder_content_script.ebs—Instead of dumping all objects in a folder, the user ID is evaluated to determine what level/caveats have been assigned. The results are compared and object level/caveat settings are displayed appropriately. If clearance level has not been set, the object will not display. Cabinets are write-protected to prevent users from storing objects in other than folders.
To show contents of an In Box, display level/caveats.
Flow Path: CUSTOM$/views/contents/inbox
Files: 1) in_box_content_script.ebs—added code to query custom attributes for clearance level and each program caveat associated with the object. No need to look at user since protection is provided by route to specific user code.
To allow contributors to request PDF rendition from SSI.
Flow Path: CUSTOM$/views/actions/dm_document
Files: 1) action_docu_contents.ebs—modified to display a link that invokes a background job to request autorender pro to create a PDF rendition of the document.
To allow users to mark an object with a level and caveats
Flow Path: CUSTOM$/views/clearances/dm_document
File: 1) start.htm—a) gets users ID to obtain user level/caveats
  b) prompts user for document level based on user clearance level. Highest level selected by default.
  c) prompts user to select multiple caveats. All are selected by default.
  d) Uses Javascript to parse caveats and package for submission
  e) Javascript called when "save changes" button is clicked.
  2) success.htm/failure.htm—modified messages to say "clearance" instead of "attribute".
To allow users to see only documents that are allowed to see from a search.
Flow Path: CUSTOM$/views/search_facility/untyped
File: 1) results.htm—obtains user ID and passes to show results subroutine.
  2) results.ebs—modifies display to only show objects that are dominated by user clearance level and caveats. Same algorithm as dm_content_script.ebs.
To allow users to see a checked out file only if clearance level was marked upon creation.
Flow Path: CUSTOM$/views/contents/working_files
File: 1) start.htm—obtains user ID and passes to display contents subroutine.
  2) working_files_content_script.ebs—determines what checked out files are shown to user based on marking of document.

For each document displayed from a folder, list the clearance level and associated caveats.
Flow Path: CUSTOM$/list_items
File: dm_document_script.ebs—after the subject line,
  1) pull the level from the attributes in the database
  2) display level
  3) pull each caveat repeating attribute from database
  4) display each caveat.
PDF Rendition—subroutine to queue rendition job
Flow Path: CUSTOM$/operations/create-pdf/dm_document
File: start.htm—queues a request to autorender pro via server api
  1) success.htm/failure.htm—reports status of request to user.
  2) Notification from ARPro sent to In Box upon completion.
Route document/Import/Create new documents into SCMKMP
Flow Path: CUSTOM$/operations/create_document/dm_folder
/import_object/dm_folder
/route_adhoc/dm_sysobject.
Files: start.htm (route_adhoc)
  1) take out availability to send to a group—mod to javascript and doc basic display users sub.
  2) mod display users to look at the clearance level/caveats of each user and compare document to level/caveats route before including in pick list of users.
Files: A. start.htm (import)—for IE version 4+ browser
  1) hard coded object type as secure-doc
  2) took out type selection—select statements.
  B. process_ie3.htm—same as above for browser by Netscape and IE version 3 and below.
  C. succeed.htm—add a button to set clearance and caveats.
Files: 1) start.htm (create document)—took out type selection list for object. Hard coded type to be secure-doc.in form submission.
  2) succeed.htm—added button to set clearance level/caveat.
To allow a user to only see what the user dominates in a virtual document.
Flow Path: CUSTOM$/views/components/dm_document
File: start.htm—obtains and looks at user identification compared against clearance levels/caveats of each object contained in virtual document. Lists and labels objects accordingly.
  Note: The virtual document must be created and managed through workspace.
Customized and tested adding USER CLEARANCES frame to APP.
Flow Path: CUSTOM$/app
File: Modified: frameset_logged_in_java_navbar.htm—adds new frame that stays during session.
  New: clearance-header.htm
    1) obtain user ID
    2) List out user name—clr/clr/clr . . . with a red background in the new frame generated by frameset_logged_in_java_navbar.htm file.

Figure 4A:
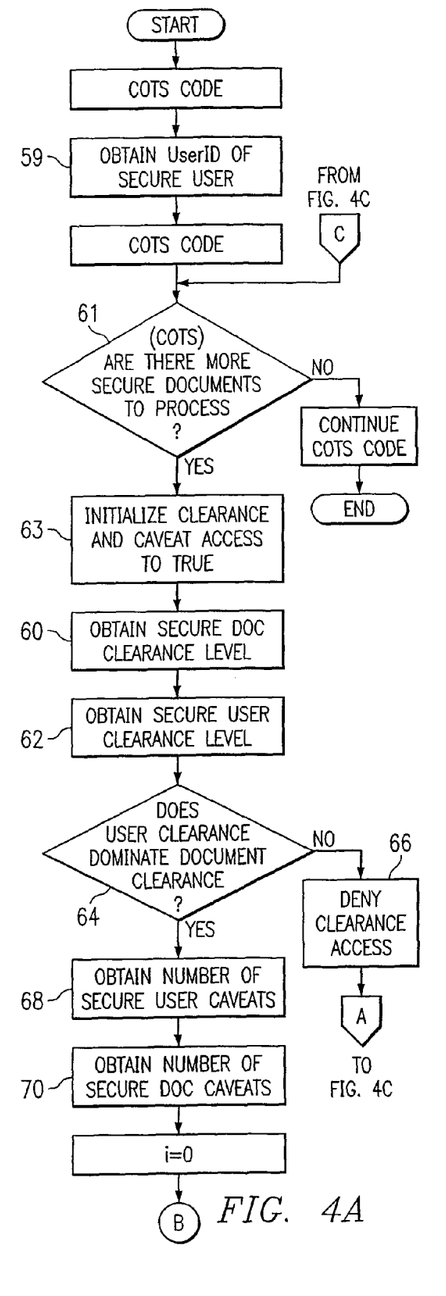
FIGS. 4A, 4B and 4C is a high level abstraction (flow chart) of the security filtering algorithm for the knowledge management system of FIG. 1.
Figure 4B:
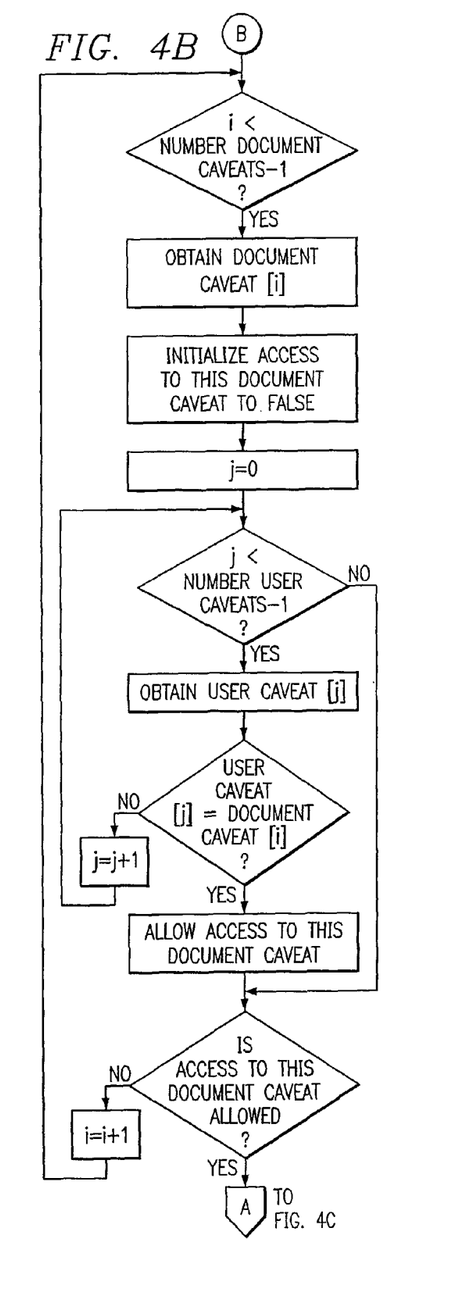
Figure 4C:
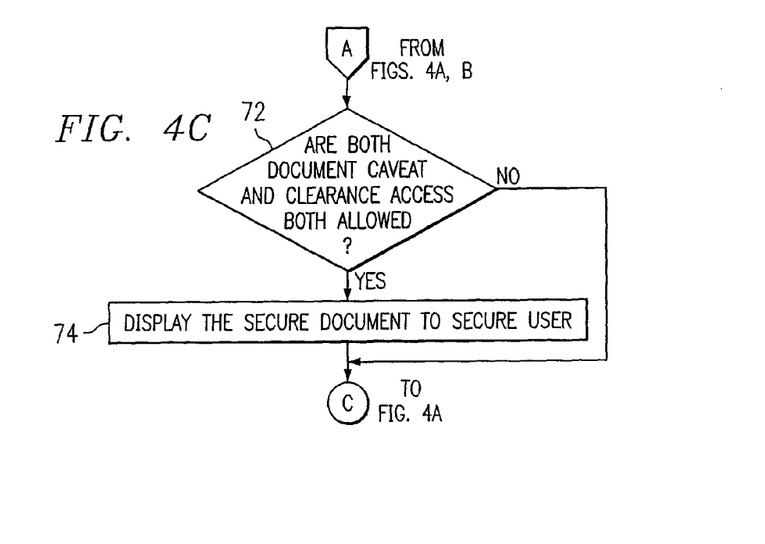

Referring to FIGS. 4A, 4B and 4C, there is illustrated a high level abstraction (flowchart) of the security filtering algorithm for the management system of FIG. 1. Initially, the user's ID is obtain at an operation 59, an inquiry 61 determines if there are more secure documents to process. If the inquiry is a positive response, then the algorithm proceeds as follows. The algorithm initializes clearance and caveat access at 63.

```
Obtain clearance level of document (60).
    case clearance level of document (DOC)
        when TS doc-clear=3 (Top Secret)
        when S doc-clear=2 (Secret)
        when C doc-clear=1 (Confidential)
        when U doc-clear=0 (Unclassified)
        all else doc-clear=4
    end case clearance.
    Obtain clearance level of user (62).
    Case clearance level of user
        when TS user-clear=3
        when S user-clear=2
        when C user-clear=1
        when U user-clear=0
    end case clearance.
```

---

```
DOC-ACCESS = 1
If user-clear < doc-clear (64) then
    DOC-ACCESS = 0 (66)
else caveat access = 1. The number of secure user caveats is obtain 68
followed by obtaining 70 the number of secure document caveats.
    For i = 1 to # document caveats (doc cavs)
        The algorithm then proceeds as illustrated in Figures 6B and 6C.
        If doc-cav [i] < > " " then
            this-cav = 0
            for j = 0 to num__user-cavs – 1
                obtain user-cav [j]
                if user__cav [j] = doc__cav [i] then
                    this-cav = 1
                    exit for
                endif
            end for document caveats
            If user-cav = 0 then
                cav-access = 0
                exit for
            endif
        endfor
    if Doc-Access and cav-access allowed 72 then
        display-content 74
```

---

While the invention has been described in connection with a preferred embodiment, it is not intended to limit the scope of the invention to this particular form set forth, but, on the contrary, it is intended to cover alternatives, modifications, equivalents, and it may be included within the spirit and scope of the invention as defined in the appended Claims.

What is claimed is:

1. A layered defense-in-depth knowledge-based management system, comprising:
a reception zone including a first one or more computers operable to authenticate a user for access to the system, wherein the reception zone is further operable to:
determine a clearance level of a requested document;
determine a clearance level of the authenticated user;
compare the clearance level of the document with the clearance level of the authenticated user;
determine a number of document caveats associated with the requested document;
for each of the number of document caveats, obtain the respective document caveat for the requested document, the respective document caveat representing a necessary condition for access to the document;
determine a number of user caveats of the authenticated user;
for each of the number of user caveats, obtain the respective user caveat representing a condition necessary for the authenticated user to have access to a document having an associated document caveat;
for all combinations of the user caveats and the document caveats, compare the document caveat of the requested document to the user caveat of the authenticated user, wherein the comparison of the document caveat of the requested document to the user caveat of the authenticated user comprises a comparison of the necessary condition for access to the document and the condition necessary for the authenticated user to have access to the document having the associated document caveat; and
display the requested document to the authenticated user in response to the clearance level of the user dominating the clearance level of the requested document and the comparison of all combinations of the user caveats to the document caveats;
an operations zone including a second one or more computers operable to adjudicate on a user level access to data objects stored in a system database;
a security zone including a third one or more computers operable to issue certificates of accessibility for defined users; and
wherein the system prevents any modification of the clearance level and the document caveats after the clearance level and the document caveats have been associated with the requested document.

2. A layered defense-in-depth knowledge-based management system as in claim 1, wherein the security zone is further operable to revoke certificates for users no longer allowed access to the system.

3. A layered defense-in-depth knowledge-based management system as in claim 2, wherein the security zone is further operable to perform key recovery operations.

4. A layered defense-in-depth knowledge-based management system as in claim 1, wherein the security zone comprises filters operable to control and limit access to a predefined set of user workstations.

5. A layered defense-in-depth knowledge-based management system as in claim 1, wherein the reception zone comprises a public key infrastructure operable to authenticate users for accessing contents of the system.

6. A layered defense-in-depth knowledge-based management system as in claim 1, wherein the reception zone is further operable to authenticate a server.

7. A layered defense-in-depth knowledge-based management system as in claim 1, further comprising a screening zone operable to interrogate data packets during processing thereof.

8. A layered defense-in-depth knowledge-based management system as in claim 1, wherein the operations zone is further operable to packet filter incoming and outgoing messages.

9. A layered defense-in-depth knowledge-based management system as in claim 1, wherein the security zone is further operable to packet filter incoming and outgoing messages for access control.

10. A layered defense-in-depth knowledge-based management system as in claim 1, wherein the operations zone comprises a document management server operable to establish access to data stored in a library of the management system.

11. A method of accessing an electronic support library for layered defense-in-depth knowledge-based management, comprising:
authenticating, using one or more computers in a reception zone a user in response to a request for data;

conducting, using the one or more computers, document manipulation and administration in an operations zone of a request by an authenticated user;

issuing, using the one or more computers, authorization certificates in a security zone for users to allow access to data managed in the operations zone;

determining, using the one or more computers, a clearance level of a requested document;

determining, using the one or more computers, a clearance level of the authenticated user;

comparing, using the one or more computers, the clearance level of the document with the clearance level of the authenticated user;

determining, using the one or more computers, a number of document caveats associated with the requested document;

for each of the number of document caveats, obtaining, using the one or more computers, the respective document caveat for the requested document, the respective document caveat representing a necessary condition for access to the document;

determining, using the one or more computers, a number of user caveats of the authenticated user;

for each of the number of user caveats, obtaining, using the one or more computers, the respective user caveat representing a condition necessary for the authenticated user to have access to a document having an associated document caveat;

for all combinations of the user caveats and the document caveats, comparing, using the one or more computers, the document caveat of the requested document to the user caveat of the authenticated user, wherein the comparison of the document caveat of the requested document to the user caveat of the authenticated user comprises a comparison of the necessary condition for access to the document and the condition necessary for the authenticated user to have access to the document having the associated document caveat;

displaying the requested document to the authenticated user in response to the clearance level of the user dominating the clearance level of the requested document and the comparison of all combinations of the user caveats to the document caveats; and preventing any modification of the clearance level and the document caveats after the clearance level and the document caveats have been associated with the requested document.

12. The method of accessing an electronic support library as in claim 11, wherein authenticating a user in the reception zone comprises authenticating the user to a public key infrastructure.

13. The method of accessing an electronic support library as in claim 11, further comprising accessing data stored in the electronic support library by a document management server.

14. The method of accessing an electronic support library as in claim 11, further comprising packet filtering incoming and outgoing messages in and through the operations zone.

15. The method of accessing an electronic support library as in claim 14, further comprising packet filtering incoming and outgoing messages for access to authorization certificates issued by the security zone.

16. The method of accessing an electronic support library as in claim 11, further comprising authenticating, in the reception zone, a server.

17. The method of accessing an electronic support library as in claim 11, further comprising interrogating, in a screening zone, data packets during processing thereof.

18. A layered defense-in-depth knowledge-based management system, comprising:

a reception zone including a first one or more computers operable to authenticate a user for access to the system, wherein the reception zone comprises a public key infrastructure operable to authenticate users for accessing contents of the system, the reception zone further operable to:

authenticate a server;

determine a clearance level of a requested document;

determine a clearance level of the authenticated user;

compare the clearance level of the document with the clearance level of the authenticated user;

determine a number of document caveats associated with the requested document;

for each of the number of document caveats, obtain the respective document caveat for the requested document, the respective document caveat representing a necessary condition for access to the document;

determine a number of user caveats of the authenticated user;

for each of the number of user caveats, obtain the respective user caveat representing a condition necessary for the authenticated user to have access to a document having an associated document caveat;

for all combinations of the user caveats and the document caveats, compare the document caveat of the requested document to the user caveat of the authenticated user, wherein the comparison of the document caveat of the requested document to the user caveat of the authenticated user comprises a comparison of the necessary condition for access to the document and the condition necessary for the authenticated user to have access to the document having the associated document caveat; and display the requested document to the authenticated user in response to the clearance level of the user dominating the clearance level of the requested document and the comparison of all combinations of the user caveats to the document caveats;

a screening zone including a second one or more computers operable to interrogate data packets during processing thereof;

an operations zone including a third one or more computers operable to adjudicate on a user level access to data objects stored in a system database, wherein the operations zone is further operable to packet filter incoming and outgoing messages, wherein the operations zone comprises a document management server operable to establish access to data stored in a library of the management system; and a security zone including a fourth one or more computers operable to:

issue certificates of accessibility for defined users;

revoke certificates for users no longer allowed access to the system;

perform key recovery operations; and wherein the security zone comprises filters operable to control and limit access to a predefined set of user workstations, wherein the security zone is further operable to packet filter incoming and outgoing messages for access control.

* * * * *